US010121512B2

(12) United States Patent
Segal et al.

(10) Patent No.: US 10,121,512 B2
(45) Date of Patent: *Nov. 6, 2018

(54) SYSTEM AND METHOD FOR PROVIDING AND INTERACTING WITH COORDINATED PRESENTATIONS

(71) Applicant: Touchcast LLC, New York, NY (US)

(72) Inventors: Edo Segal, New York, NY (US); Dmytro Panin, Brooklyn, NY (US)

(73) Assignee: TOUCHCAST LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,377

(22) Filed: Dec. 22, 2017

(65) Prior Publication Data

US 2018/0122423 A1  May 3, 2018

Related U.S. Application Data

(63) Continuation of application No. 15/608,932, filed on May 30, 2017, now Pat. No. 9,852,764, which is a
(Continued)

(51) Int. Cl.
*H04N 5/265* (2006.01)
*G11B 27/031* (2006.01)
*H04N 5/222* (2006.01)

(52) U.S. Cl.
CPC ......... *G11B 27/031* (2013.01); *H04N 5/2222* (2013.01); *H04N 5/2226* (2013.01); *H04N 5/265* (2013.01)

(58) Field of Classification Search
None
See application file for complete search history.

(56) References Cited

U.S. PATENT DOCUMENTS

| 6,020,931 A | 2/2000 | Bilbrey et al. |
| 7,577,978 B1 | 8/2009 | Wistendahl et al. |
| | (Continued) | |

FOREIGN PATENT DOCUMENTS

| GB | 2 502 986 | 12/2013 |
| WO | WO 2010/141939 | 12/2010 |
| | (Continued) | |

*Primary Examiner* — Eileen M Adams
(74) *Attorney, Agent, or Firm* — Leason Ellis LLP

(57) ABSTRACT

Disclosed is a system and method for generating a coordinated presentation. Content selected by a user is curated, and a plurality of images are captured for inclusion. A first data stream for the curated content and a second data stream for the captured images are received. A portion of a subject within each second data stream image is defined. An appearance of movement is tracked, and at least some of the plurality of images in the second data stream is modified. The respective content associated with the two data streams is integrated, including the modified at least some of the plurality of images, to generate the coordinated presentation that is capable of transmission to and receipt by one or more remote devices, and wherein the coordinated presentation is configured to enable interaction with at least a portion of the curated content at each of the one or more remote devices.

20 Claims, 23 Drawing Sheets

Related U.S. Application Data continuation-in-part of application No. 14/813,974, filed on Jul. 30, 2015, now Pat. No. 9,666,231, which is a continuation-in-part of application No. 14/316,536, filed on Jun. 26, 2014, now Pat. No. 9,363,448, said application No. 15/608,932 is a continuation-in-part of application No. 15/247,534, filed on Aug. 25, 2016, now Pat. No. 9,787,945, which is a continuation-in-part of application No. 14/833,984, filed on Aug. 24, 2015, now Pat. No. 9,661,256, which is a continuation-in-part of application No. 14/316,536, filed on Jun. 26, 2014, now Pat. No. 9,363,448.

(60) Provisional application No. 62/031,114, filed on Jul. 30, 2014, provisional application No. 62/209,727, filed on Aug. 25, 2015, provisional application No. 62/242,029, filed on Oct. 15, 2015, provisional application No. 62/329,081, filed on Apr. 28, 2016, provisional application No. 61/839,757, filed on Jun. 26, 2013, provisional application No. 61/845,743, filed on Jul. 12, 2013.

(56) References Cited

U.S. PATENT DOCUMENTS

| | | |
|---|---|---|
| 8,508,614 B2 | 8/2013 | Segal |
| 8,584,164 B2 | 11/2013 | Walter et al. |
| 8,745,657 B2 | 6/2014 | Chalozin et al. |
| 9,036,043 B2 | 5/2015 | Segal |
| 9,363,448 B2 | 6/2016 | Segal |
| 9,852,764 B2 * | 12/2017 | Segal .................... H04N 5/2222 |
| 2001/0006382 A1 | 7/2001 | Sevat |
| 2002/0186233 A1 | 12/2002 | Holtz et al. |
| 2005/0137958 A1 | 6/2005 | Huber et al. |
| 2008/0096175 A1 | 4/2008 | Du Toit et al. |
| 2008/0120675 A1 * | 5/2008 | Morad ............... H04N 7/17318 725/120 |
| 2008/0150913 A1 | 6/2008 | Bell et al. |
| 2009/0066690 A1 | 3/2009 | Harrison |
| 2009/0153804 A1 | 6/2009 | Giraldo et al. |
| 2009/0237565 A1 | 9/2009 | Staker et al. |
| 2010/0174783 A1 | 7/2010 | Zarom |
| 2011/0202827 A1 | 8/2011 | Freishtat |
| 2011/0298935 A1 | 12/2011 | Segal |
| 2013/0073985 A1 | 3/2013 | Hamlin et al. |
| 2013/0173355 A1 | 7/2013 | Barcenas |
| 2013/0212615 A1 | 8/2013 | Schultz |
| 2014/0002581 A1 | 1/2014 | Bear et al. |
| 2014/0086557 A1 * | 3/2014 | Yu ........................ G11B 27/034 386/241 |
| 2014/0132702 A1 | 5/2014 | Leibovich et al. |
| 2014/0215542 A1 | 7/2014 | Terpe |
| 2016/0098941 A1 * | 4/2016 | Kerluke .................. G06F 3/017 700/91 |

FOREIGN PATENT DOCUMENTS

| | | |
|---|---|---|
| WO | WO 2012/139082 | 10/2012 |
| WO | WO 2013/076478 | 5/2013 |
| WO | WO 2013/167901 | 11/2013 |

* cited by examiner

SYSTEM AND METHOD FOR PROVIDING AND INTERACTING WITH COORDINATED PRESENTATIONS

CROSS-REFERENCE TO RELATED APPLICATION

This patent application is a continuation of U.S. patent application Ser. No. 15/608,932, filed May 30, 2017, now U.S. Pat. No. 9,852,764, issued Dec. 26, 2017, which is a continuation-in-part of U.S. patent application Ser. No. 14/813,974, filed Jul. 30, 2015, now U.S. Pat. No. 9,666, 231, issued May 30, 2017, which is based on and claims priority to U.S. Provisional Patent Application Ser. No. 62/031,114, filed on Jul. 30, 2014, and Ser. No. 14/813,974 is a continuation-in-part of U.S. patent application Ser. No. 14/316,536, filed Jun. 26, 2014, now U.S. Pat. No. 9,363, 448, filed Jun. 7, 2016; further U.S. patent application Ser. No. 15/608,932 is a continuation-in-part of U.S. patent application Ser. No. 15/247,534, filed Aug. 25, 2016, now U.S. Pat. No. 9,787,945, issued Oct. 10, 2017, and U.S. application Ser. No. 15/247,534 is based on and claims priority to U.S. Provisional Patent Application Ser. No. 62/209,727, filed Aug. 25, 2015, U.S. Provisional Patent Application Ser. No. 62/242,029, filed Oct. 15, 2015, and U.S. Provisional Patent Application Ser. No. 62/329,081, filed Apr. 28, 2016; further U.S. application Ser. No. 15/247, 534 is a continuation-in-part of U.S. application Ser. No. 14/833,984, filed Aug. 24, 2015, now U.S. Pat. No. 9,661, 256, issued May 23, 2017, which is a continuation-in-part of U.S. application Ser. No. 14/316,536, filed Jun. 26, 2014, now U.S. Pat. No. 9,363,448, issued Jun. 7, 2016, which is based on and claims priority to U.S. Provisional Patent Application Ser. No. 61/839,757, filed Jun. 26, 2013 and U.S. Provisional Patent Application Ser. No. 61/845,743, filed Jul. 12, 2013, the entire contents of all of which are incorporated by reference as if expressly set forth in their respective entireties herein.

FIELD

The present application relates, generally, to content presentation and, more particularly, to a system and method for providing and interacting with coordinated presentations.

BACKGROUND

Interactive and supplemental content that has been made available to viewers has been done through a decoupled, separate communication channel. For instance, a producer can provide a separate communication channel with data, a video stream, or both over the Internet via a URL associated with the broadcast. For example, a television station can have on-air programming and also provide supplemental Internet-based content available through a website. Apart from sponsoring both sources of information, these communication channels are generally decoupled from one another. In other words, the broadcaster has only an indirect relationship to the viewer with regard to any supplemental content.

The present application addresses this in a system and method in which the broadcaster, who may be an individual using a portable computer device, provides viewers with the ability to launch supplemental content that has been curated by the broadcaster to the topics and information sources chosen by the broadcaster. As such, a more personal and deeper experience can be had by utilizing the present invention.

It is with respect to these and other considerations that the disclosure made herein is presented.

BRIEF SUMMARY OF THE INVENTION

In one or more implementations, herein is a system and method for generating a coordinated presentation. A computing device having a processor and a memory is configured by code stored in the memory and executed by the processor to curate content selected by a user for inclusion in the coordinated presentation. A plurality of images is captured, at least via an image capture device, for inclusion in the coordinated presentation. A first data stream associated with the curated content and a second data stream associated with the captured images are received, and a portion of a subject within each of the plurality of images in the second data stream is defined, wherein the portion comprises less than any one image. An appearance of movement of the portion of the subject is tracked within each of the plurality of images, and at least some of the plurality of images in the second data stream is modified, as a function of the tracked appearance of movement, by displaying the portion in a single position. The respective content associated with the two data streams is integrated, including the modified at least some of the plurality of images, to generate the coordinated presentation that is capable of transmission to and receipt by one or more remote devices, and wherein the coordinated presentation is configured to enable interaction with at least a portion of the curated content at each of the one or more remote devices.

These and other aspects, features, and advantages of the invention can be understood with reference to the following detailed description of certain embodiments of the invention taken together in conjunction with the accompanying drawing figures.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE EMBODIMENTS

Figure 1:
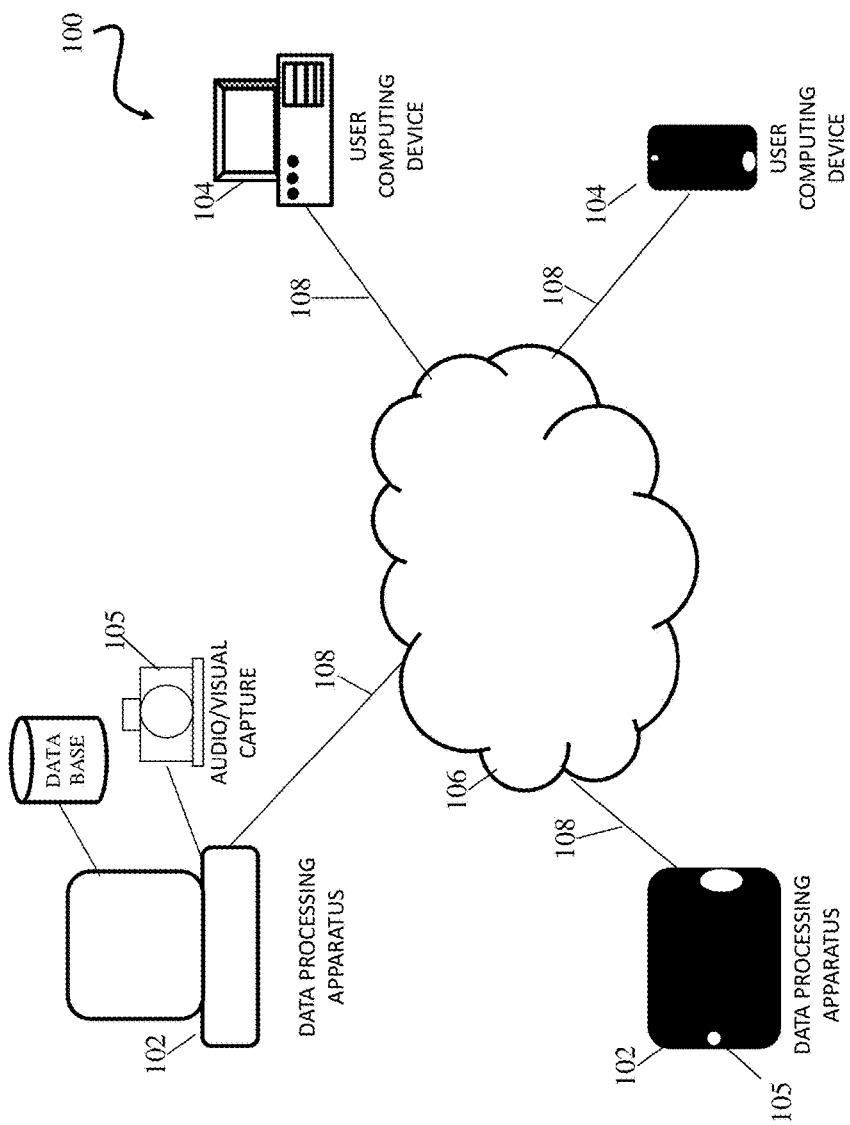
FIG. 1 is a diagram illustrating an example hardware arrangement that operates for providing the systems and methods disclosed herein.

By way of introduction and overview, in one or more implementations the present application provides systems and methods for authoring and playing video that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable coordinated presentations including videos that include customizable and interactive features for use by one or more end-users that receive the presentations. Further, the software applications provide a viewing/interactive tool, referred to herein, generally, as a "consuming" interface, for end-users who receive videos that are authored in accordance with the present application. Using the client interface, users may interact with videos as a function of touch and gestures, as well as other suitable interfaces, such as a mouse, trackball, keyboard or other input. Some functionality available for end-users is defined by an author.

In one or more implementations, a video mixer module can be provided that comprises instructions executing so as to configure a processor to integrate a plurality of images captured by a camera together with a portion of the curated content via a user selection from a touch-screen interface, and thereby to generate a coordinated presentation that is capable of transmission to and receipt by one or more remote devices; and wherein the coordinated presentation is configured to enable interaction with the portion of the curated content at each of the remote devices such that results of a respective interaction at a particular remote device are viewable at the particular remote device but are not viewable at (a) other of the remote devices and (b) the display.

In one or more implementations, coordinated presentations may be configured with interactive options, which may include images, video content, website content, or computer programs (collectively referred to herein, generally, as "vApps"). An authoring tool can be integrated with a player tool, and the tools enable one or more vApps to be embedded in video or, in one or more implementations, a code is embedded in the video for enhanced functionality. For example, a play/pause button can be provided that enables a user to play or pause playback of a coordinated presentation. A timeline function can be provided that identifies a current time location within a coordinated presentation as well as to navigate therein. VApp icons can be provided that represent vApps that are included with the current coordinated presentation at respective time locations therein. In accordance with one or more implementations, as a respective icon is selected by the user, the coordinated presentation jumps to the corresponding time location, and the user can interact with the respective vApp. Information can be time coded in video, and selectable user interactive elements for navigation/time can be provided.

In one or more implementations, the present application includes and improves functionality for chroma key compositing, often referred to as use of a "green screen" and/or "blue screen." In one or more implementations, a computing device configured with an authoring tool and interface for developing distributable coordinated presentations manipulates background content provided in a coordinated presentation as a function of the movement and angle the camera(s) used during recording of the coordinated presentation. In addition or in the alternative to basing the manipulation of background content on movement and/or the angle of a camera used during recording, one or more foreground elements can be the basis of such background manipulation. Thus, a module executing on a device configured with an authoring tool detects an angle of view, such as a function of camera position and/or angle of view of one or more foreground elements, and manipulates the appearance of the composited background content to eliminate an otherwise static appearance of the background content. The background content can be, for example, a composited in place of background provided in a respective color range (e.g., green). By manipulating the background content in a dynamic way, the background content eliminates a static appearance that otherwise decreases the realism of the imagery, and requires more from the viewer to suspend disbelief. By adjusting and/or manipulating the virtual background in association with movement or visual appearance of foreground elements, the coordinated presentation appears significantly more real to the viewer.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present application.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present application, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other software and/or hardware tools, to provide received data on audio/visual devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an embodiment of the present application, user computing device 104 provides user access to data processing apparatus 102 for the purpose of receiving and providing information. Examples and description of specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., unswitched data connection 108. Permanent connectivity ensures that access to data processing apparatuses 102 is always available.

Figure 2:
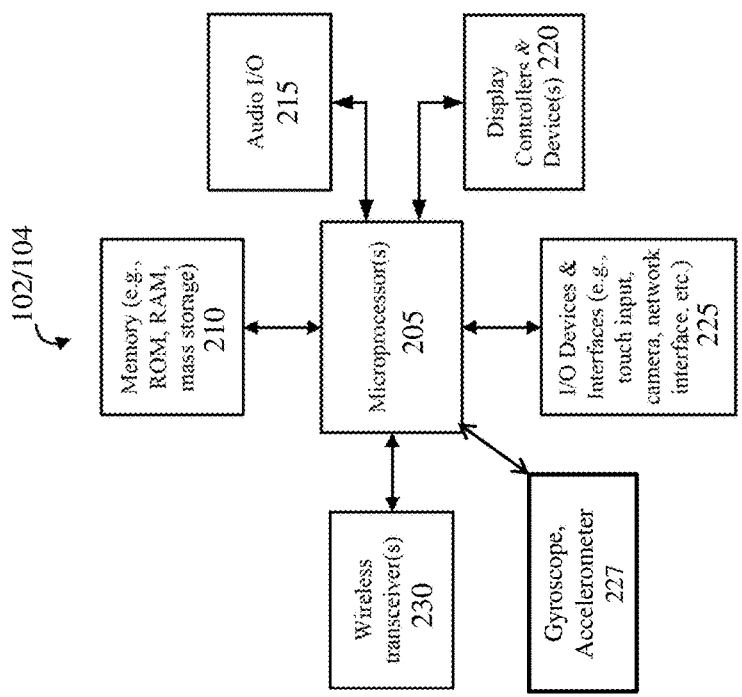
FIG. 2 is a block diagram that illustrates functional elements of a computing device in accordance with an embodiment.

FIG. 2 illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type of memory.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh computer when running Mac OS operating system software or an iPad, iPhone, or similar device when running mobile computing device operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided.

It will be appreciated that one or more buses, may be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc. to connect the system 100 with another device, external component, or a network.

Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

The present application can operate to provide functionality for substantially real-time compositing, which can include capturing of whatever is being displayed in the video frame, including from the camera or other content source, as well as capturing meta-data that is around or otherwise associated with one or more elements of the content, which is usable to report to a player device at a later point in time. Meta-data can include, for example, XML data. In this way, when a user interacts with a coordinated presentation, hypertext markup language ("HTML") (or other suitable content) may be served from the host server and used as a function in the coordinated presentation. This enables implementation of a fully (or at least partially) interactive platform.

In one or more implementations of the present application, information associated with one or more active user events and/or inactive effects, such as zoom, virtual/optical effects (e.g., fisheye), GPS tracking information or the like can be processed to provide input, as well, and that contributes to a determination of suitable movement and/or adjustment of the background content. For example, gyroscope and/or accelerometer information is stored in one or more databases, such as in a data log file. The gyroscope and/or accelerometer information can be captured frame by frame, and can represent the position, orientation and/or heading associated with content in each frame. The background adjustment module processes information representing, for example, that pivoting occurs (e.g., by the camera 105) and results in corresponding pivot and/or other adjustment of the appearance of the virtual background.

Figure 3:
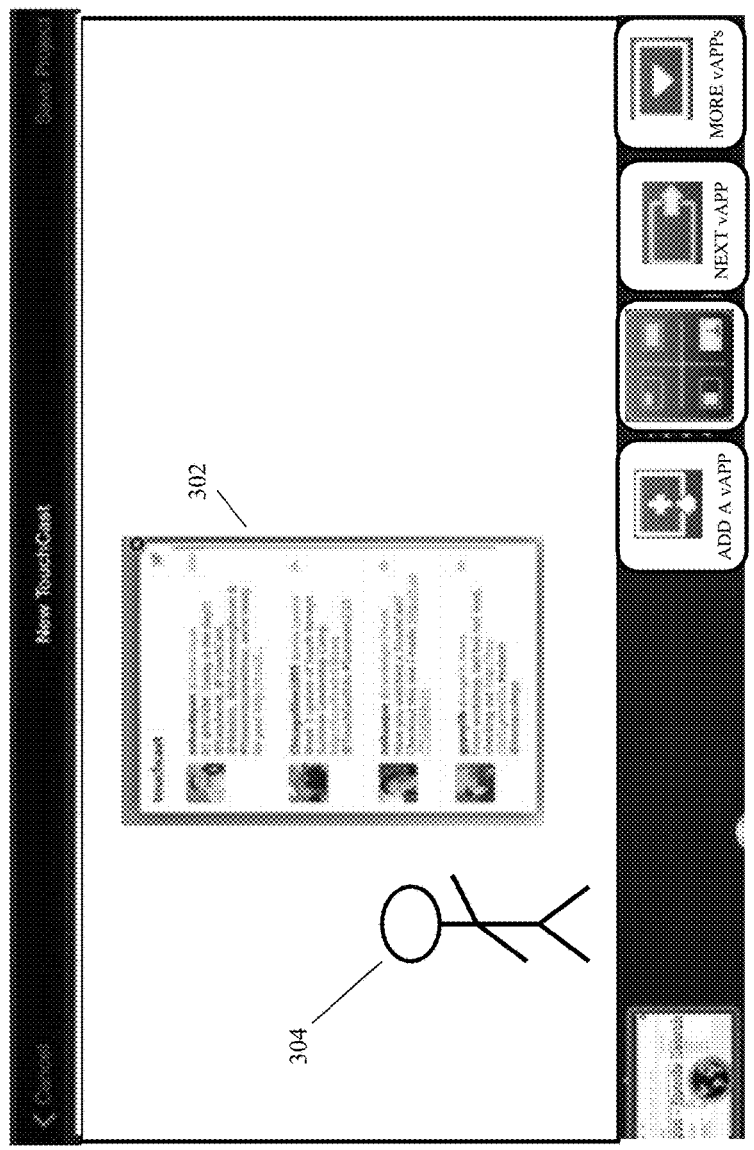
FIG. 3 illustrates another example representation of authoring a coordinated presentation in accordance with the present application.

In one or more implementations, the present application supports integrating content comprising HTML, such as a body of an Internet web page, as background in connection with green screen functionality. For example, during the authoring process and after selecting a control selecting for selecting green screen functionality, e.g., via a chroma key module, an author can select a respective Internet web page to replace content. FIG. 3 illustrates an example implementation in which an interactive web page 302 is provided as a background content during authoring of a coordinated presentation. In addition to the web page 302 being chosen for the background content to replace any green-colored content, a user overlay option, referred generally herein as "silhouette," background author 304 can be virtually placed within the background content (e.g., web page 302), itself. Positioning of the author 304 within the background content can be affected using standard selection and movement gestures, such as swiping, pinching or the like. In addition to author 304 being provided as the foreground element, the author 304 can be switched as the background element. Accordingly, a vApp (e.g., web page 302) effectively becomes the background content, while maintain its interactivity, for example, for author and viewer.

In one or more implementations, the present application can be associated with videoconferencing technology, such as shown and described in commonly assigned U.S. patent application Ser. No. 15/247,534, filed Aug. 25, 2016, now U.S. Pat. No. 9,787,945, issued Oct. 10, 2017, which, as noted above, is incorporated by reference as if set forth in its entirety herein.

The present application provides benefits associated with maintaining at least a portion of a subject captured in a frame within a predetermined and/or specified region thereof. This can be provided, notwithstanding the subject moving around or by movement of the capture device (e.g., a camera). Subject movement and/or camera movement can contribute to the subject appearing to move in and out of the frame, which is distracting to the viewer. The present application provides a technical solution to the visual distraction caused by images of a person, e.g., person's head, that moves in and out of the frame, such as during a videoconferencing session.

In one or more implementations, the present application includes one or more modules that include code that, when executed by a processor, configures the processor to provide content within a predefined video frame shown on each of at least one display device. The module(s) configure the processor to provide the content such that the content does not appear to leave the frame, notwithstanding movement of the subject and/or capture device during capture.

For example, an area of a person's upper body (e.g., a person's head or face) is captured by a camera during a videoconference. During movement (subject and/or camera movement), the body portion is tracked and the person's face (or upper body) is maintained within a centered portion of a display screen. In one or more implementations, a graphical user interface is provided on at least one computing device that includes one or more selectable controls and/or options, e.g., cursor controls, selection controls (e.g., round, rectangular, free-form selection tools), or other suitable control. During the point of capture (or at a point before or after), the user makes a selection, such as by a single-click action, a dragged selection of a region, or the like. The selection can be used by one or more processors to define a region within the frame where particular content (e.g., a person's head or face) is to be displayed, regardless of movement. Providing controls to enable users to make specific selections within a frame increases flexibility beyond simply confining content to the center of the frame. In addition to selecting the region where content is to be displayed, a user can use one or more controls to define a particular area of the subject (e.g., a person, an animal, vehicle or virtually any movable or non-movable subject) to be displayed in a defined region within a display. For example, by clicking on and/or selecting within an area associated with the subject, one or more processors can define a respective region to be tracked and maintained within the center or other previously defined region within the display, regardless of movement. Thus, as shown and described herein, the present application provides the benefit of keeping a face (head, or shoulders, etc.) positioned (e.g., centered) in a display screen during a videoconference or other video experience, and to offset distracting movements.

In one or more implementations, confining the display of a specific area of a subject within a specific region of a display can be accomplished in various ways. For example, a capture device, such as a camera, can be configured with one or more gyroscopes that detects particular camera movement. For example, as a user inadvertently moves the capture device, the area of the subject previously defined by the user moves in and out of the frame. One or more modules executing on one or more processors track the area substantially in real time, and the images are adjusted to offset the inadvertent movement in order to maintain the positioning of the area of the subject within the frame. In one or more recommendations, a calculation can be made in order to determine the percentage of the total subject to be included in the frame (e.g., X and Y coordinates of a face within the total frame). The calculation can be used to define vertical and/or horizontal percentage values for mapping the area of the subject to be maintained in a specific region within the frame. This can be accomplished by overscanning or other similar technique to preclude the entire captured frame from being displayed in the restricted field of view of the display device. As the capture device moves, the one or more gyroscopes detect the movements and information representing the motion is received and processed by one or more processors to adjust (e.g., reposition and/or resize) the overscanned area and maintain the area of the subject in the predefined region within the frame.

In one or more implementations, a gyroscope may not be accurate enough to provide information necessary to maintain the area of the subject precisely within the defined region. Moreover, one or more image capture devices may not be configured with a gyroscope. In such (or similar) circumstances, present application can include one or more modules to provide subject stabilization. Overscanning, as described above, is supported to preclude the entire captured image from being displayed in the entire frame of the display device. For example, the captured frame is cropped and the cropped portion is modified in response to detected movement (e.g., camera movement and/or subject movement). As the person or camera moves, the image(s) can be manipulated to maintain the subject (e.g., face) in the center of the display.

Figure 4A:
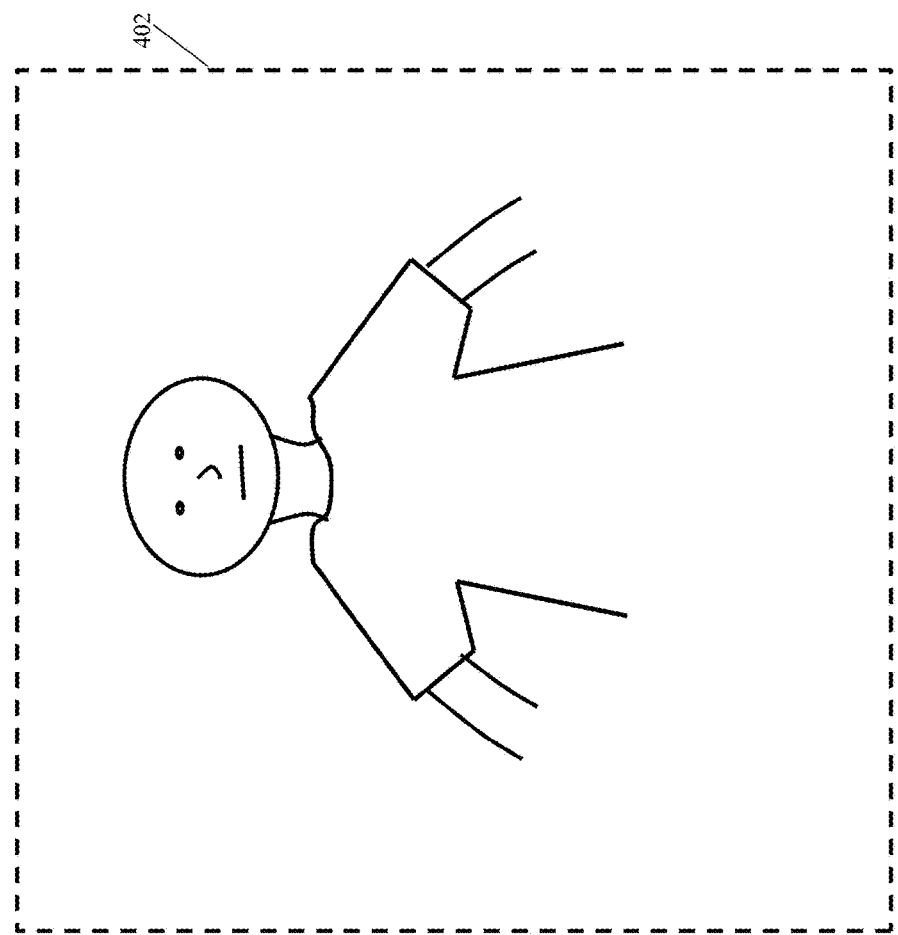
FIGS. 4A-4F illustrate a sequence and represent various features and functionality associated with the present application.
Figure 4B:
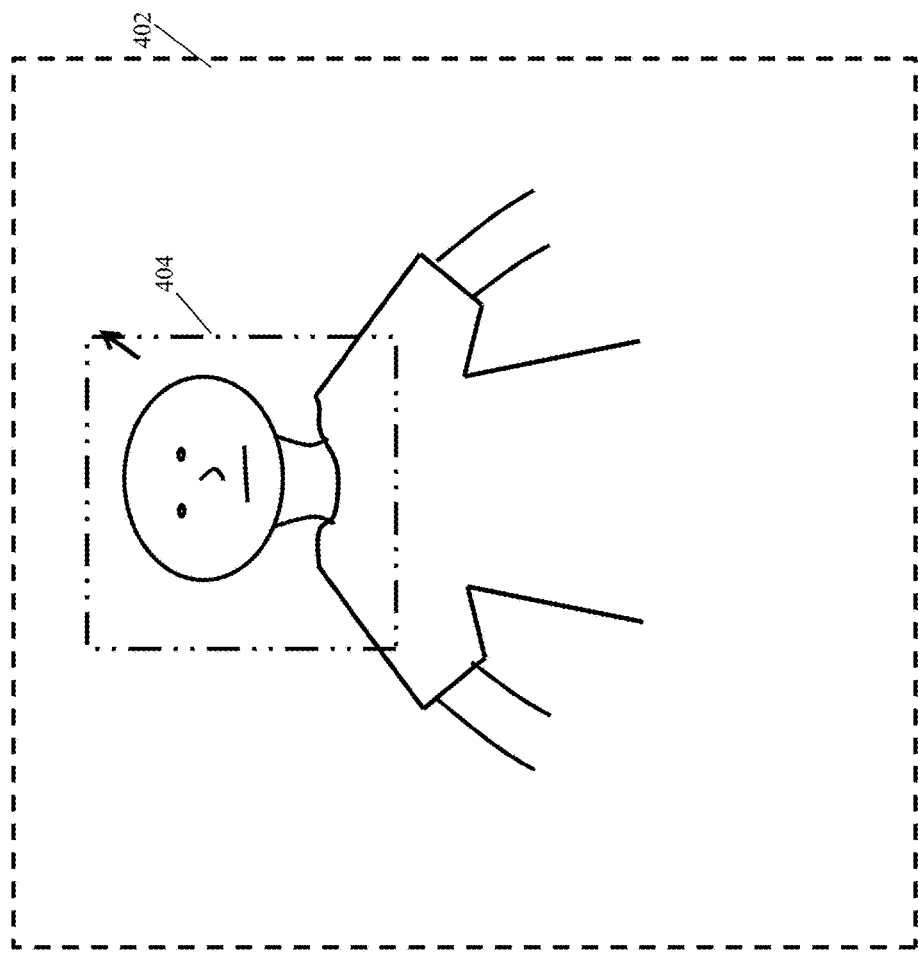

The present application is now further described with reference to FIGS. 4A-7F. FIGS. 4A-4F illustrate a sequence and represent various features and functionality associated with the present application. FIG. 4A, for example, illustrates an image of a person taking by a respective image capture device. Frame 402 represents the boundaries of the captured image, of which the person thereof comprises a percentage. As shown and described in various implementations herein, the background portion of the image shown in FIG. 4A can be a green screen, or include a different chroma value for "green screen" functionality. In the example shown, frame 402 represents the maximum amount of information captured by from image capture device. FIG. 4B includes a second frame 404 that is defined by the user. Frame 404 is usable by one or more processors to define the respective region within frame 402 for displaying specific subject matter, such as the head of the person shown in frame 402. In one or more implementations, any content contained within the defined frame 404 is tracked by one more processors and displayed within frame 404, for example during a video conferencing session.

Figure 4C:
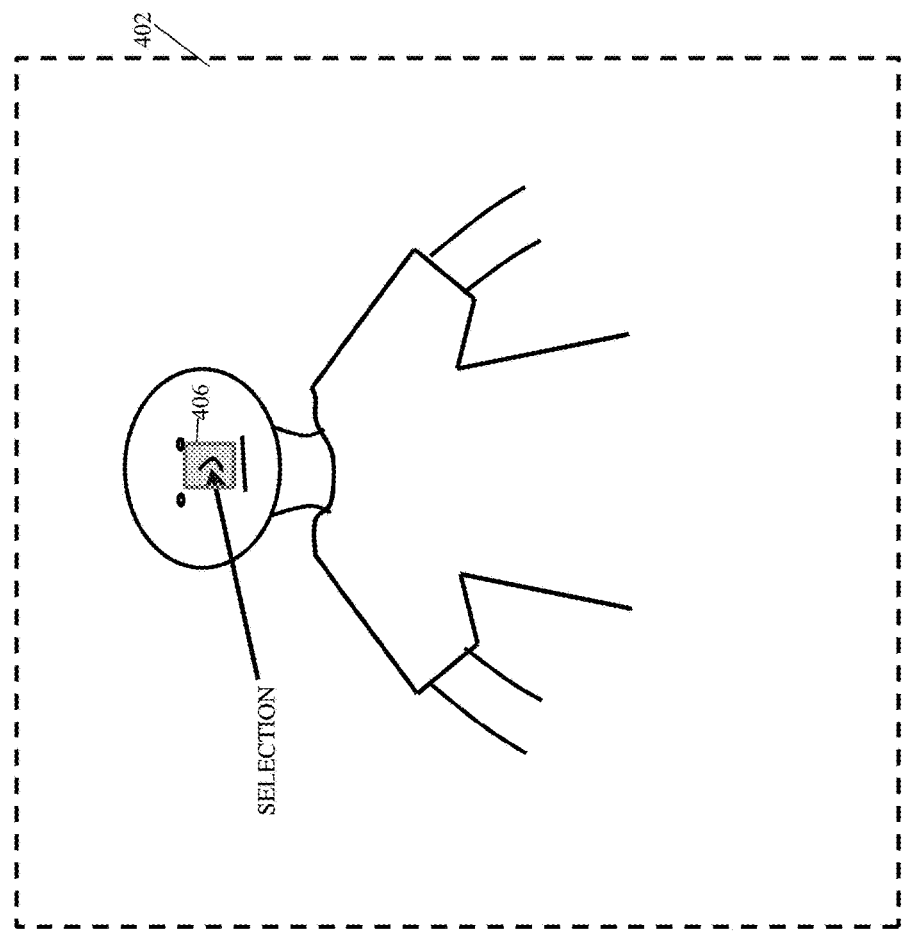

FIG. 4C illustrates another sequence of operation and/or feature associated with the present application for defining specific content to be displayed within a region of frame 402. In the example shown in FIG. 4C, a selection 406 is made by the user within the content illustrated in frame 402. For example, the selection may be a click, a drawn square, or other suitable action for defining a region within frame 402. The selection 406 is usable to define frame 404, and to place the selected region 406 within the center of frame 404.

Figure 4D:
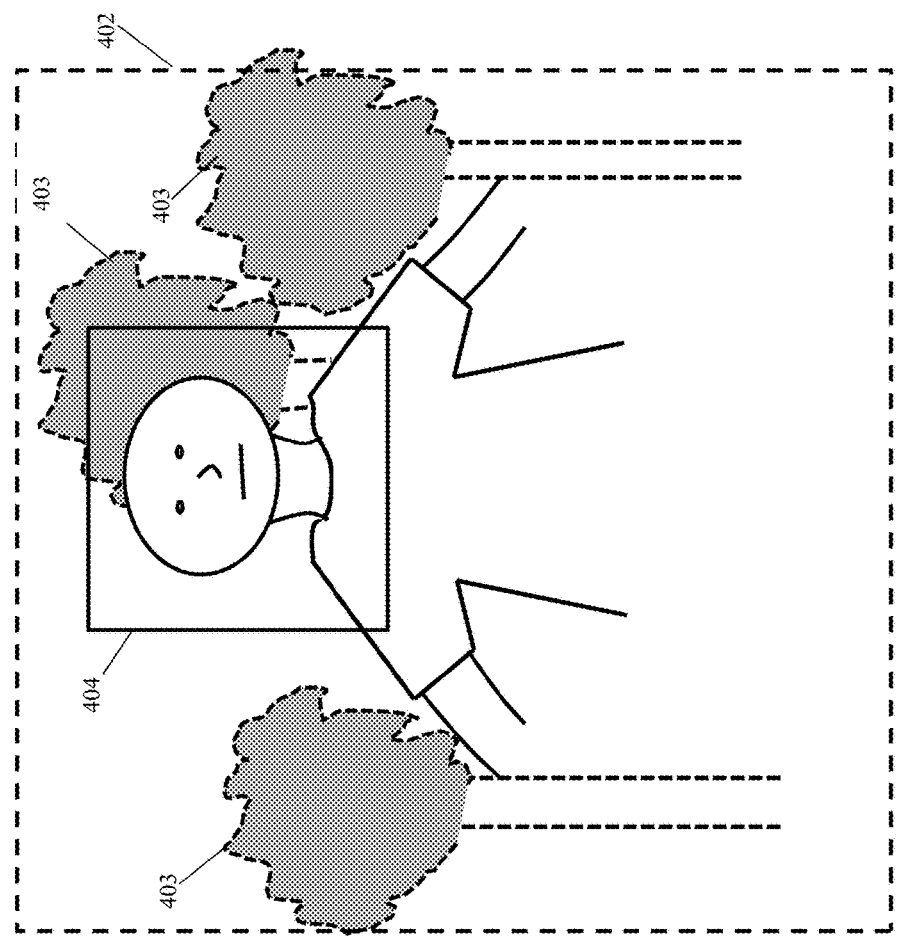
Figure 4E:
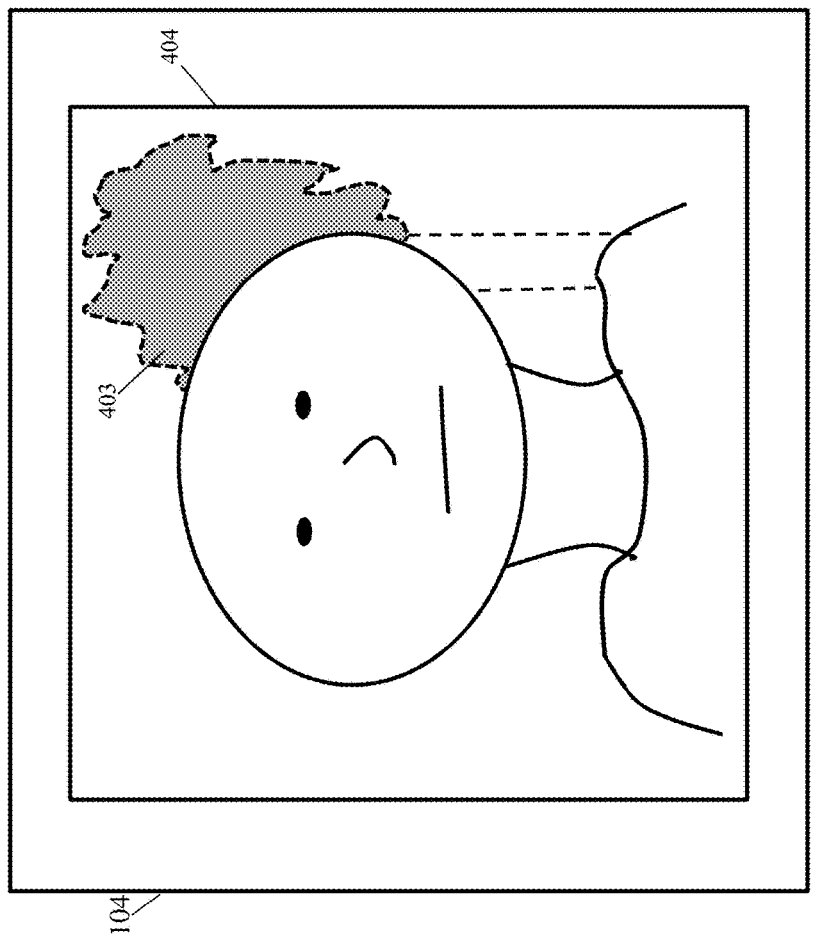
Figure 4F:
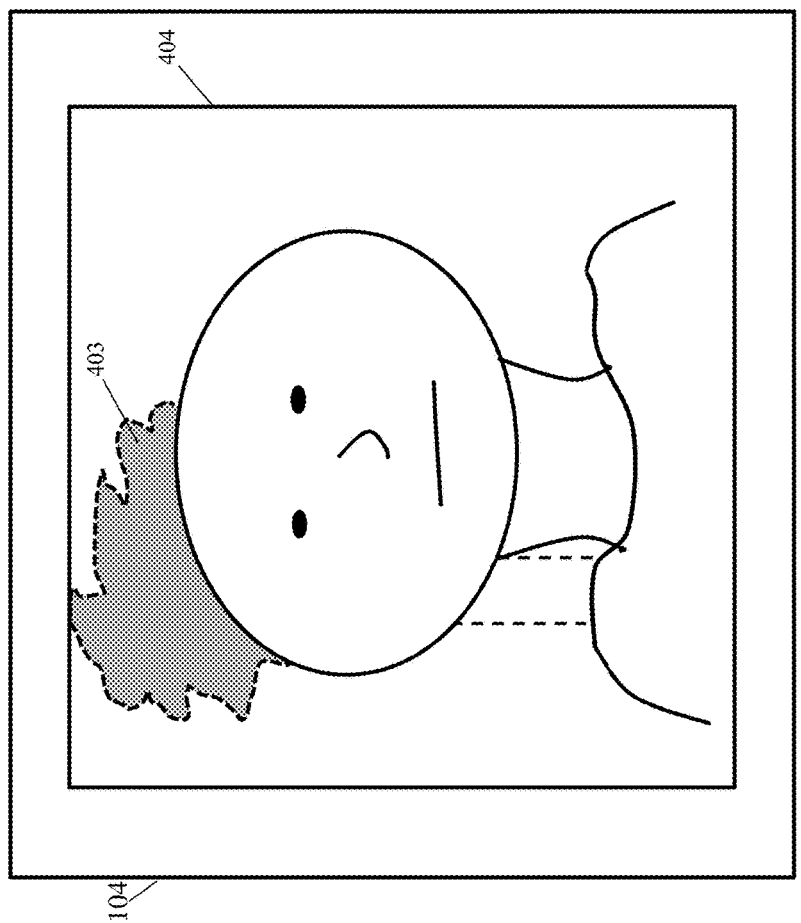

FIG. 4D illustrate an example display frame 402 and frame 404, such as following processes of defining a frame 404 (FIGS. 4B and/or 4C). In addition, FIG. 4D illustrates an implementation in which green screen functionality is employed, including virtual background elements 403, represented as trees and in broken lines. This gives the appearance that the subject is located in a wooded area. FIG. 4E illustrates an example frame 404 that is displayed on one or more user computing devices. In accordance with one or more implementations of the present application, frame 402 is not displayed on the respective user computing devices 104, as the content therein is effectively cropped to fit frame 404 and to maintain the respective content therein, regardless of movement. Moreover, FIG. 4E illustrates a virtual background that is illustrated within frame 404. In one or more implementations, the virtual background can be provided in a static fashion, such that when the subject (or image capture device) moves, the virtual background does not to move in context. This is desirable in one or more contexts in which appearance of the movement of the subject is eliminated or removed as a function of tracking the subject and adjusting the position of frame 404. In such case, the virtual background would not appear to move in context, and remain in place (such as illustrated in FIG. 4E). Alternatively, displaying movement of the subject can be desirable, notwithstanding the subject remaining within a specified region of the display (e.g., frame 404). In such case, a dynamically changing virtual background can be provided within frame 404, such as illustrated in a sequence represented in FIGS. 4E and 4F.

Figure 5A:
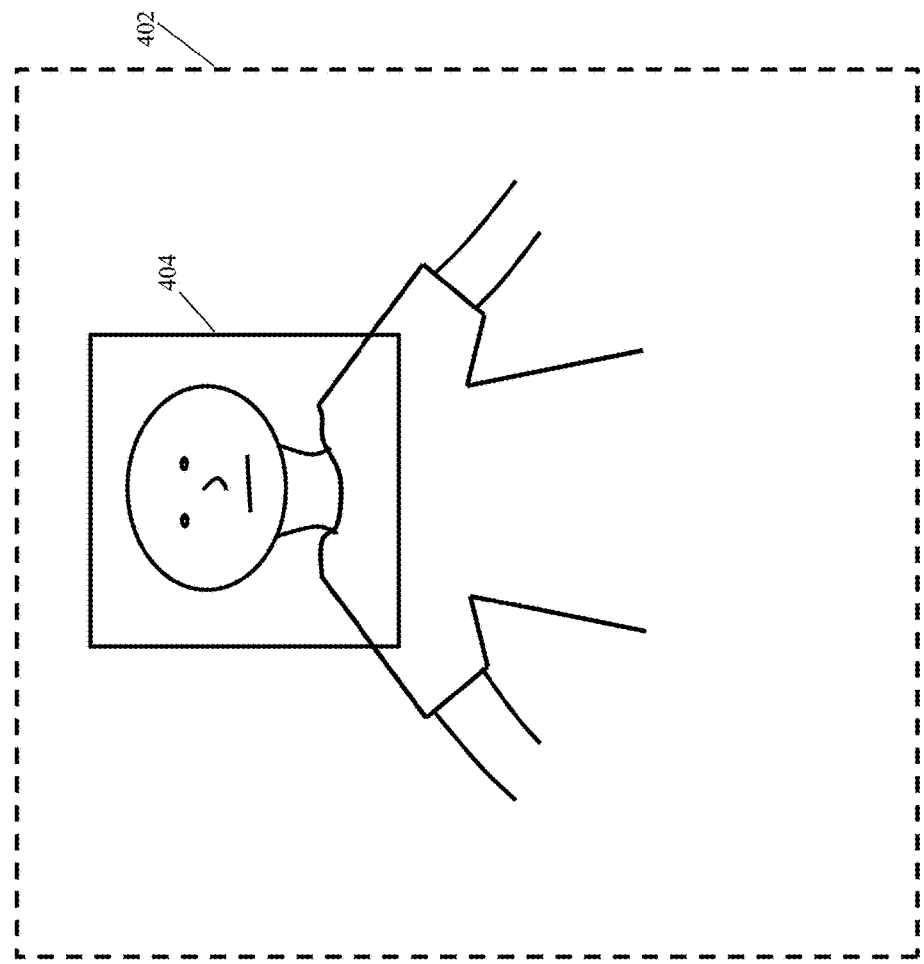
FIGS. 5A-5E illustrate an example implementation in which subject movement is tracked and content within a display frame is maintained therein, regardless of the movement.
Figure 5B:
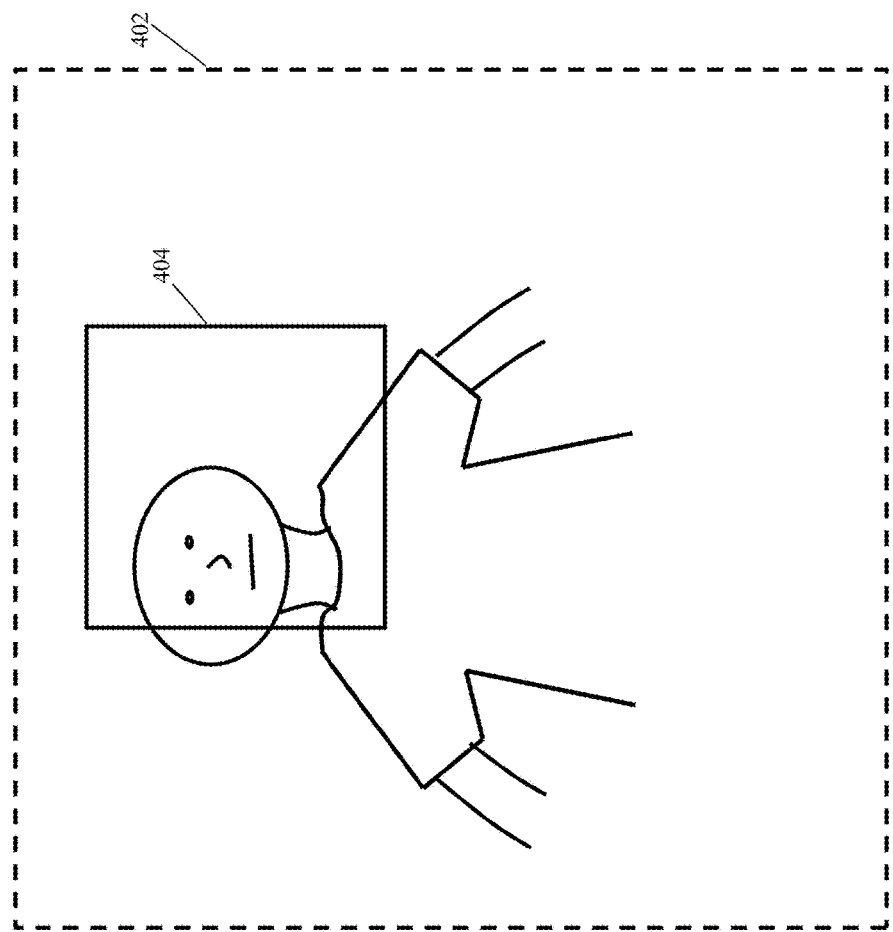
Figure 5C:
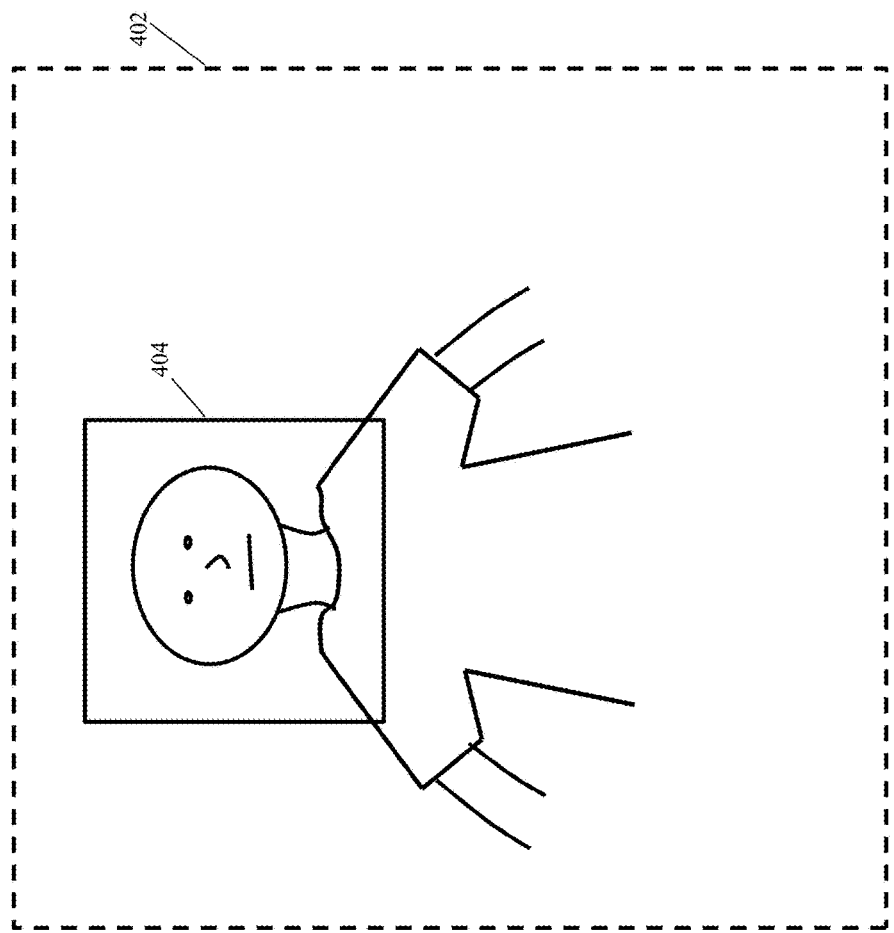
Figure 5D:
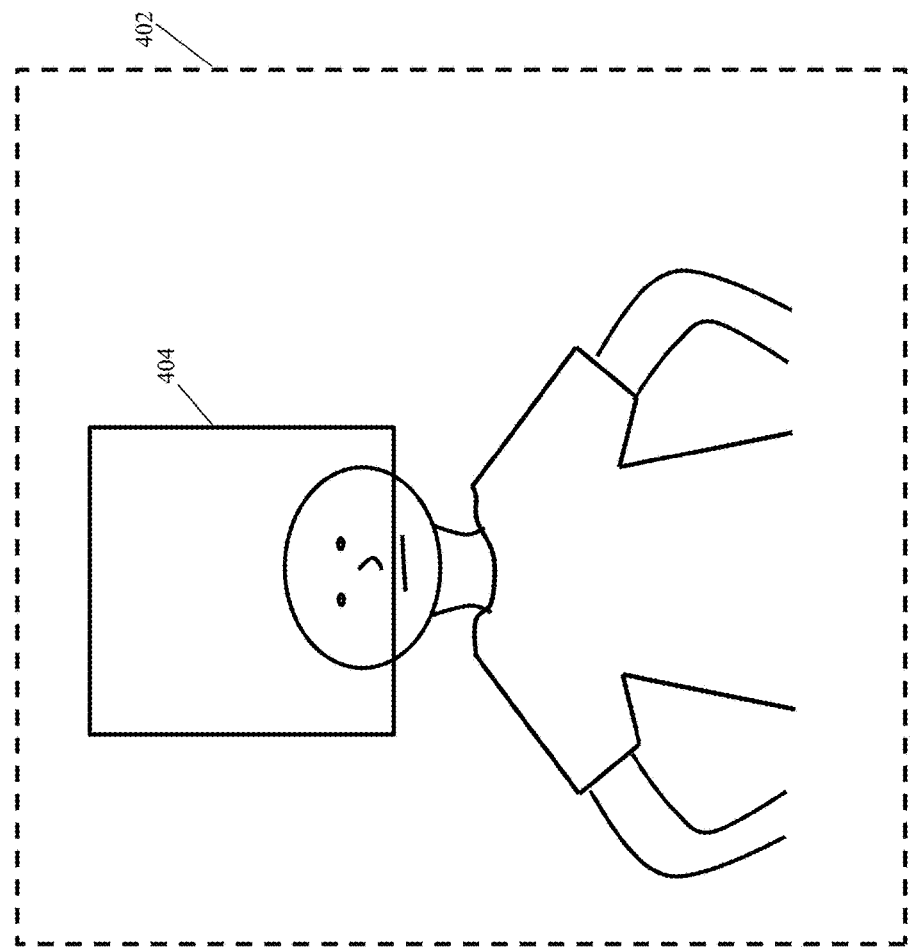
Figure 5E:
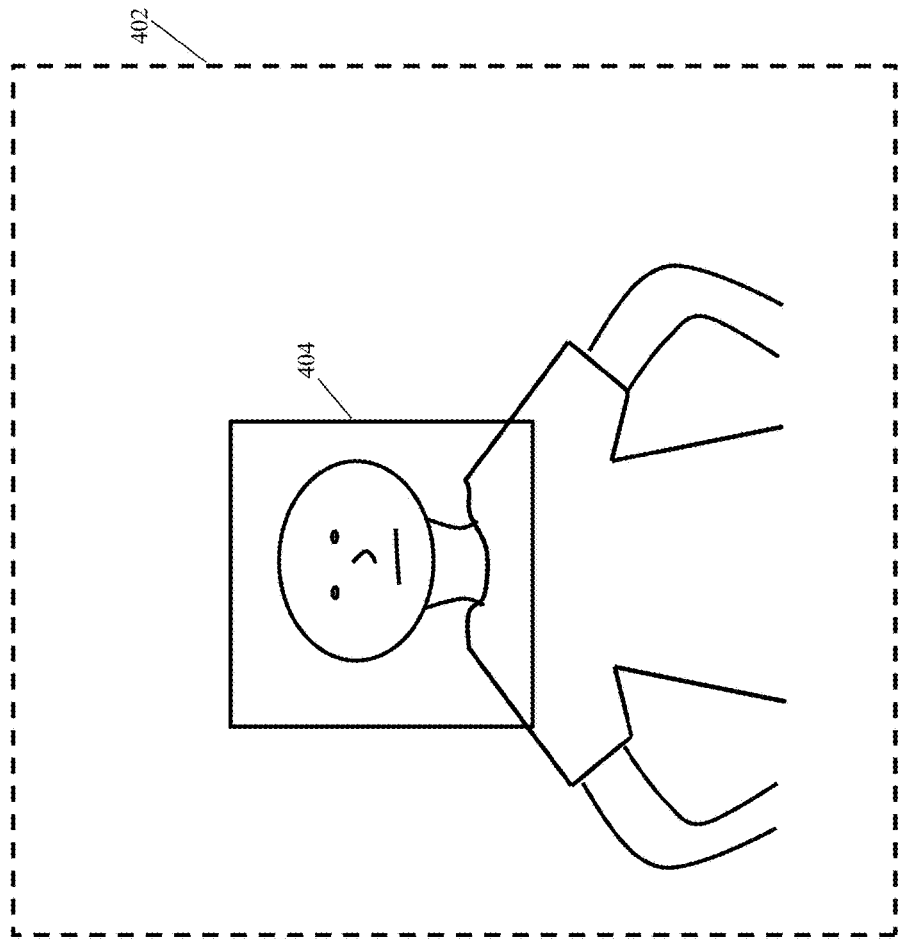

FIGS. 5A-5E illustrate an example implementation in which subject movement is tracked and content within frame 404 is maintained therein, regardless of the movement. For example, FIG. 5A illustrates an example display frame 402 and frame 404, such as following processes of defining a frame 404 (FIGS. 4B and/or 4C). During the image capture, such as during a video conferencing session, the subject moves and leaves the region defined in frame 404 (FIG. 5B). One or more processors determines that the area of the subject has moved out of frame 404, and the frame 404 moves to include the area of the subject (FIG. 5C). For example, one or more algorithms can be implemented for feature recognition, which can further ensure proper centering or other placement of the subject in the display, such as within frame 404. FIGS. 5D and 5E illustrate this a second time. In FIG. 5D, the area of the subject has moved out of frame 404, one or more processors tracked area of the subject, and the frame 404 relocates to include the area of the subject therein (FIG. 5E). In one or more implementations of the present application, a tracking and relocation of frame 404 occur instantaneously, such that the viewer of a user computing device 104 does not detect that the area of the subject ever left the frame 404 (FIG. 4E).

Figure 6A:
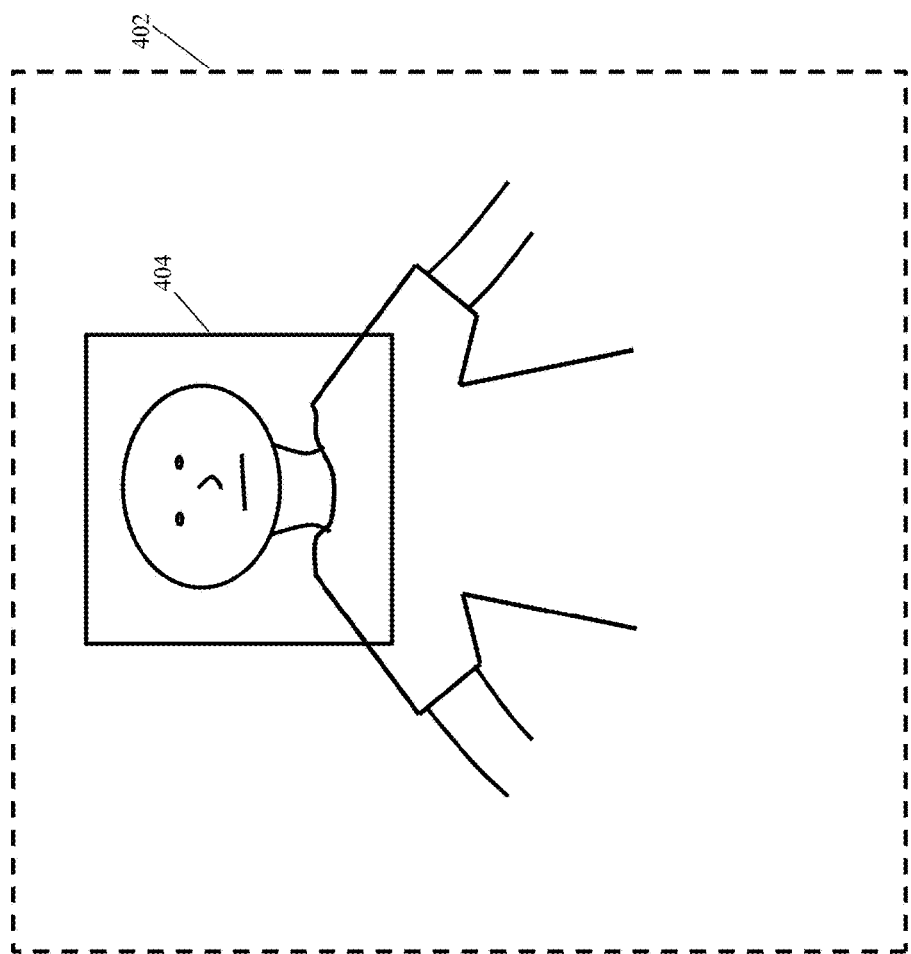
FIGS. 6A-6E illustrate an example implementation in which camera (or other) movement is tracked and content within a display frame is maintained therein, regardless of the movement.
Figure 6B:
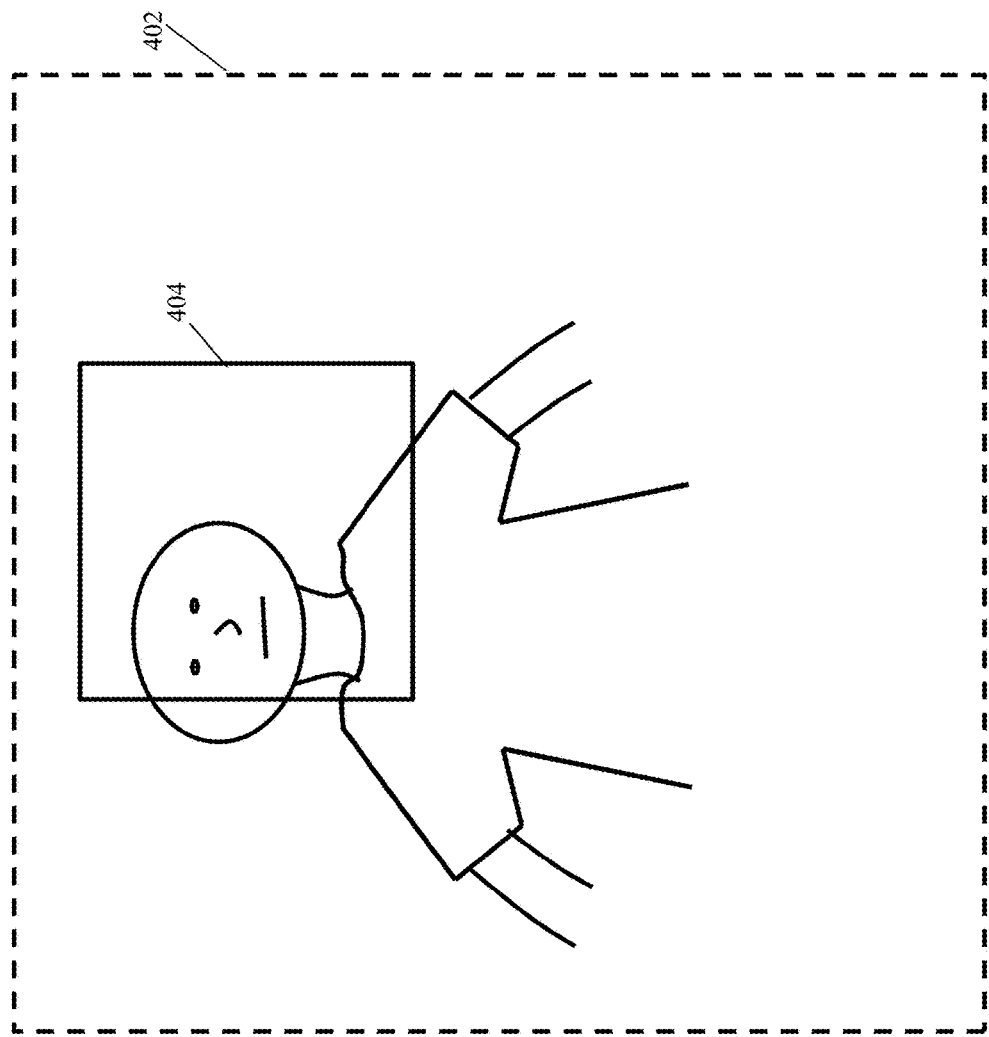
Figure 6C:
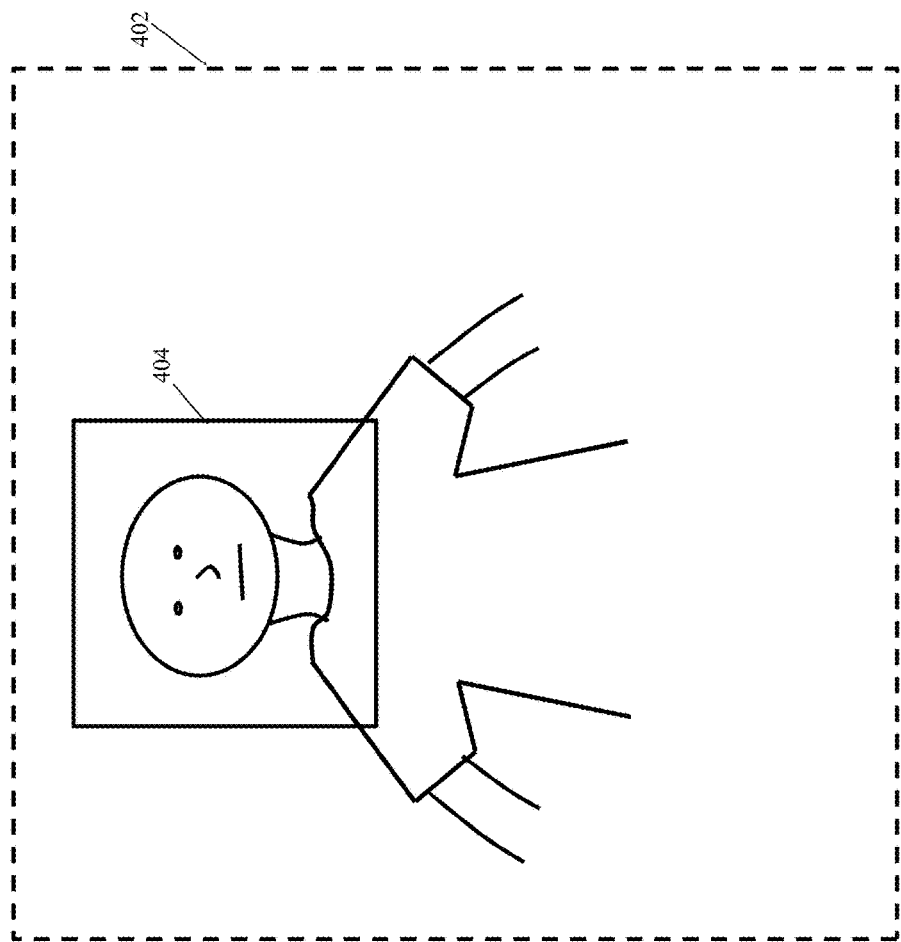
Figure 6D:
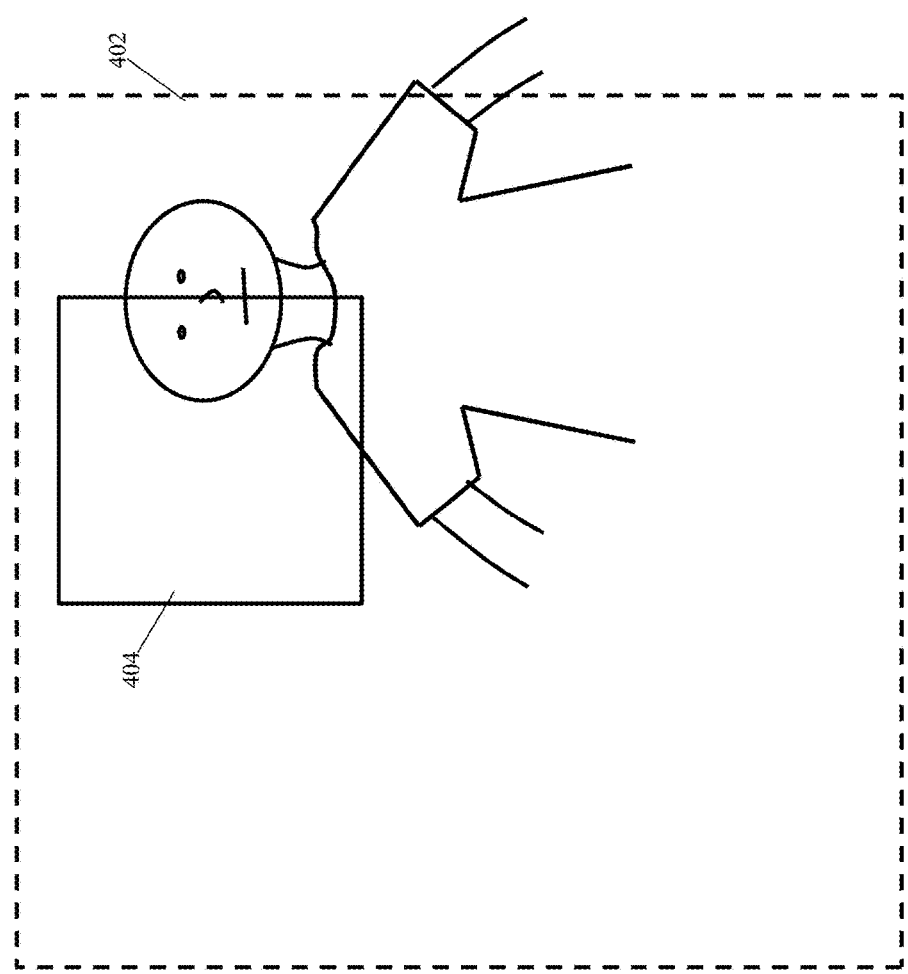
Figure 6E:
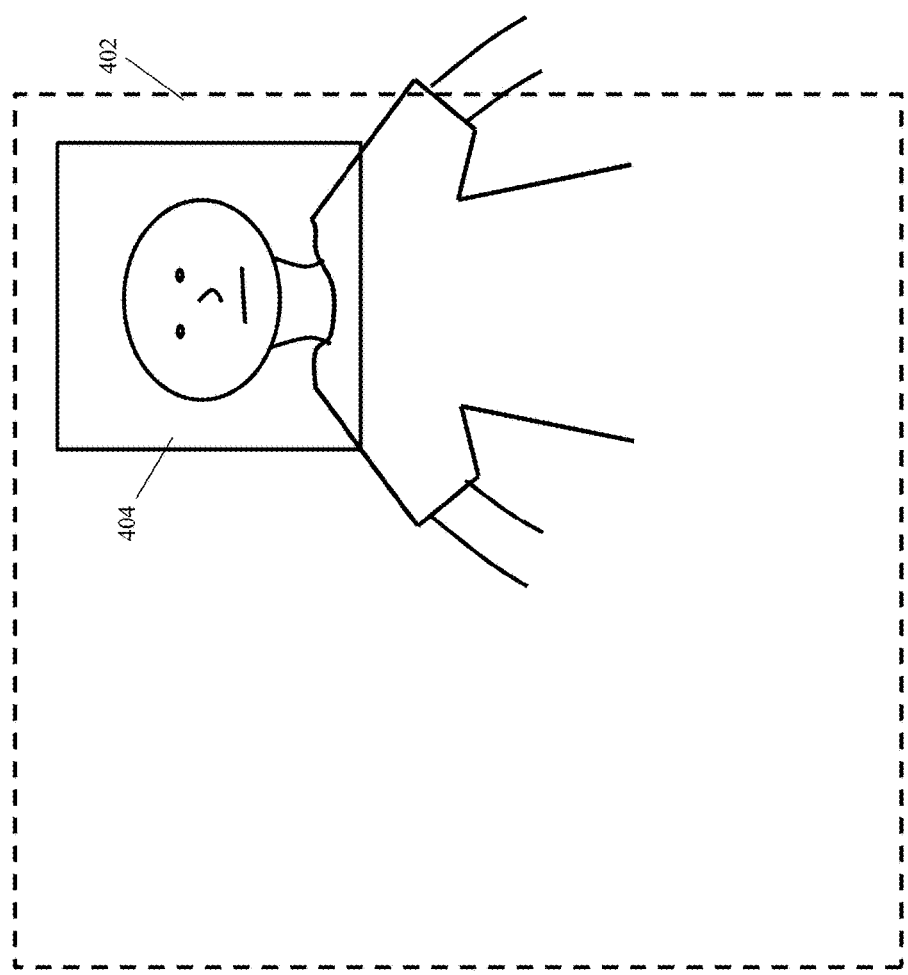

FIGS. 6A-6E illustrate an example implementation in which a camera (or other image capture device) movement is tracked and content within frame 404 is maintained therein, regardless of the movement. For example, FIG. 6A illustrates an example display frame 402 and frame 404, such as following processes of defining a frame 404 (FIGS. 4B and/or 4C). During the image capture, such as during a video conferencing session, the image capture device (e.g., camera) moves and takes the area of the subject out of the region defined by frame 404 (FIG. 6B). One or more processors determines that the area of the subject has been moved out of frame 404, and the frame 404 moves to include the area of the subject (FIG. 6C). FIGS. 6D and 6E illustrate this a second time. In FIG. 6D, the image capture device moves the area of the subject out of frame 404 (and even partially out of frame 402), and one or more processors tracked area of the subject, and the frame 404 relocates to include the area of the subject therein (FIG. 6E). In one or more implementations of the present application, a tracking of the area of the subject and relocation of frame 404 occur instantaneously, such that the viewer of a user computing device 104 does not visually detect that the respective area of the subject ever left the frame 404 (FIG. 4E).

Figure 7A:
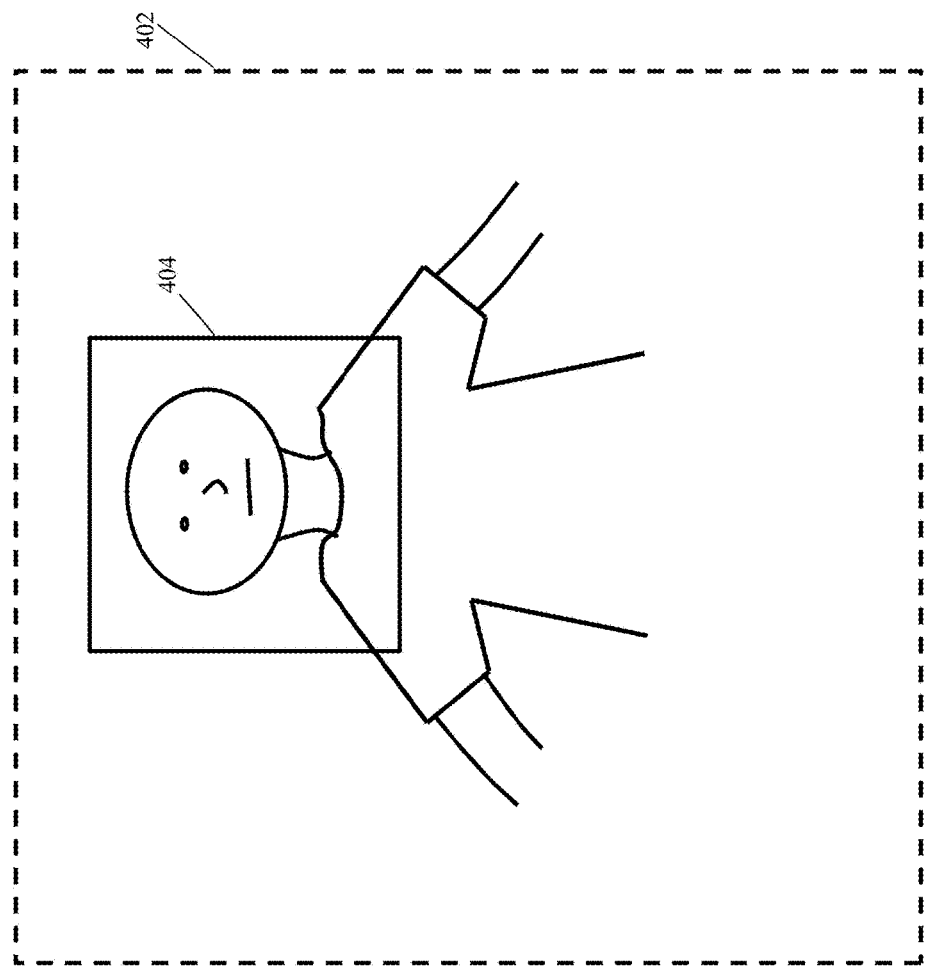
FIGS. 7A-7C illustrates an example implementation in which subject movement is tracked and focus of content within a display frame is maintained therein, regardless of the movement.
Figure 7B:
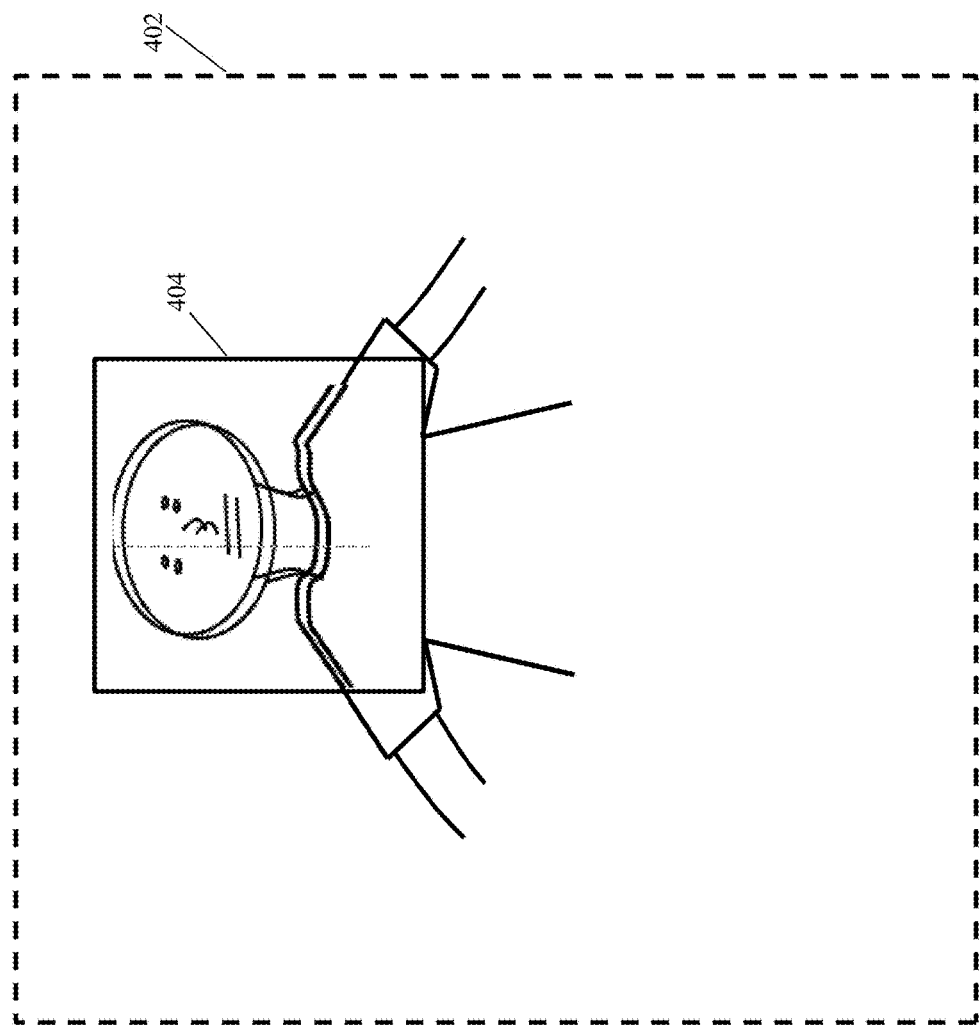
Figure 7C:
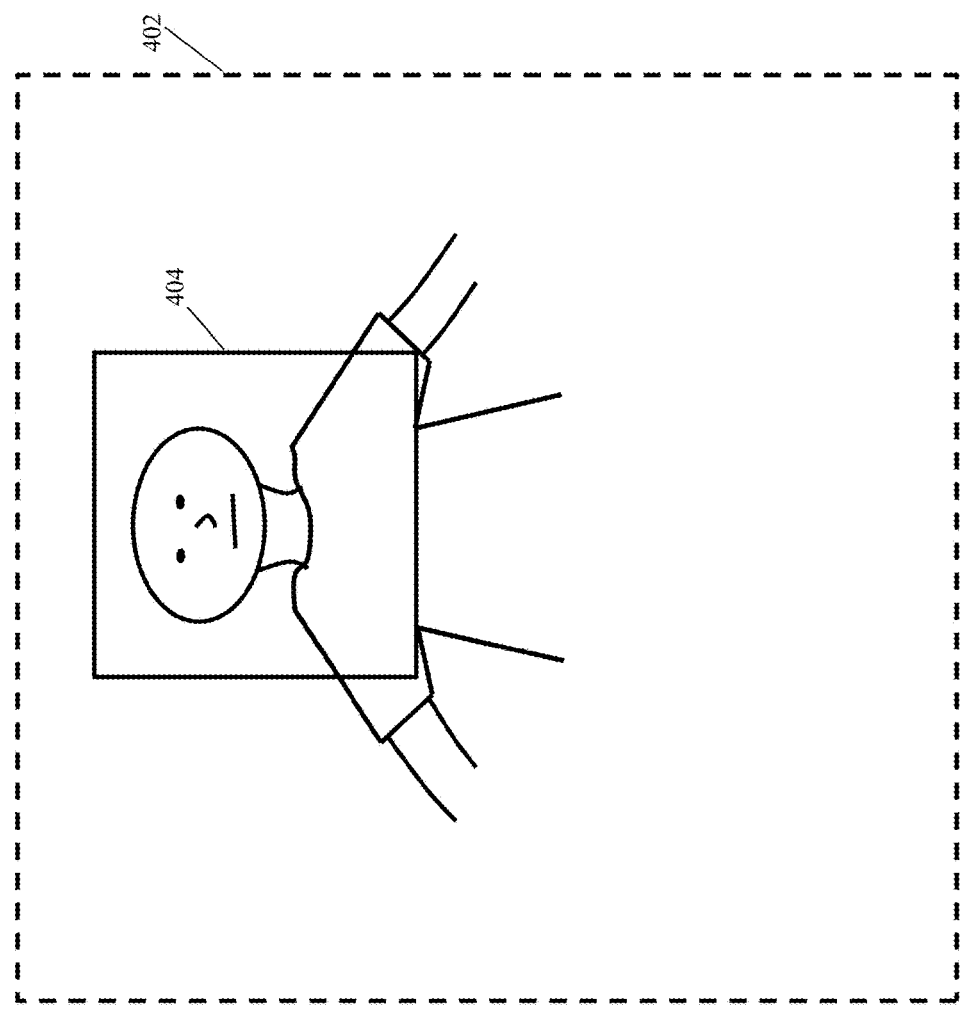

In addition to maintaining an area of a subject within a respective frame 404, the present application can be configured to determine that a subject or an area thereof has either moved from a respective position and/or an image capture device has moved from a respective position, thereby causing the area of the subject to be out of focus. For example, FIG. 7A illustrates an example display frame 402 and frame 404, such as following processes of defining a frame 404 (FIGS. 4B and/or 4C). During the image capture, such as during a video conferencing session, the subject moves and by moving out of a respective focal plane, the subject appears blurry (FIG. 7B). A determination is made, such as in accordance with a selected portion of the subject (FIG. 4C), that a portion of the subject is not sharply in focus, and an adjustment is made to bring the subject back into focus (FIG. 7C). In one or more implementations, this can be accomplished by causing one or more instructions to an autofocus module configured with image capture device, to bring the subject back into focus. Alternatively, a bracket or mount can be provided that is configured to hold the image capture device and to actuate in response to a determination that the subject is out of focus, make subtle movements to bring the area of the subject (e.g., within frame 404) back into focus.

Figure 8:
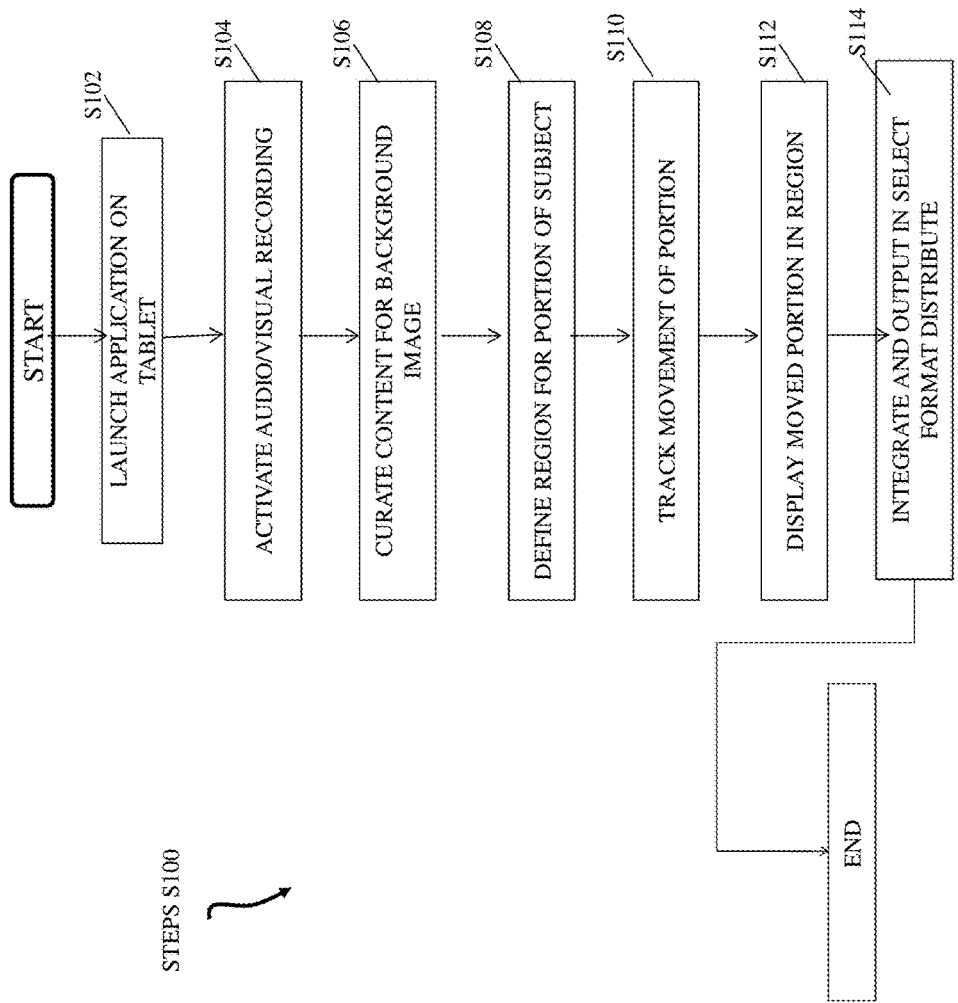
FIG. 8 is a flow diagram showing a routine that illustrates a broad aspect of the present application.

Turning now to FIG. 8, a flow diagram is described showing a routine S100 that illustrates a broad aspect of a method for authoring a coordinated presentation in accordance with at least one implementation disclosed herein. At step S102, the process starts, for the example, as an app launching on a tablet computing device. At step S104, options in the form of graphical screen controls are provided to a user for authoring a coordinated presentation, for example, in the form of camera controls, which are selectable and that cause one or more modules to execute instructions associated with the respective control to capture a first data stream that includes content from a camera configured or integrated with the user's tablet computing device. At step S106, options are provided for the user to select background image content, such as content that is stored locally on the user's computing device 102 and/or 104, or content that is available via a data communication network. One or more modules execute instructions associated with a respective selected control and to capture a second data stream, which includes the background image content.

Continuing with the example process S100 shown in FIG. 8, at step S108, a region is defined within a display for a respective portion or area of a subject. At step S110, movement of the portion of the subject is tracked. At step S112, the moved portion of the subject in the region, and at step S114, a video frame is integrated with a plurality of other video frames and output in a select format as a coordinated presentation, which is distributed. Thereafter the process ends.

Thus, as shown and described herein, technology is provided for extending green screen functionality, including to separate a subject from the background while simultaneously maintaining the appearance of the subject within a respective region within a display screen, notwithstanding subject and/or camera movement. The present application provides significant flexibility and creativity in connection with creating and viewing coordinated presentations. Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present invention.

What is claimed is:

1. A system for generating a coordinated presentation, comprising:
a computing device having a processor and a memory, the computing device being configured by code stored in the memory and executed by the processor to:
receive a first data stream associated with first content and a second data stream associated with images captured via an image capture device, wherein none of the images captured via the image capture device are included in the first content;
define a portion of a subject within each of the plurality of images in the second data stream, wherein the portion comprises less than any one image;
track an appearance of movement of the portion of the subject within each of the plurality of images;
modify, as a function of the tracked appearance of movement, at least some of the plurality of images in the second data stream by displaying the portion in a single position; and
integrate respective content associated with the two data streams, including the modified at least some of the plurality of images, to generate the coordinated presentation that is capable of transmission to and receipt by one or more remote devices.

2. The system of claim 1, wherein the computing device is further configured by code stored in the memory and executed by the processor to:

process telemetry information associated with at least one of a gyroscope and accelerometer, wherein the tracked appearance of movement is based on the telemetry information.

3. The system of claim 2, wherein the telemetry information represents computing device movement associated with distance, speed and direction in at least one of an X-axis, a Y-axis and a Z-axis.

4. The system of claim 2, wherein the computing device is further configured by code stored in the memory and executed by the processor to alter placement and/or alter an angle of view of the at least some of the content in the first data stream.

5. The system of claim 2, wherein the content in the first data stream includes a 360 degree horizontal view and a 180 degree vertical view, and
wherein the computing device is further configured by code stored in the memory and executed by the processor to:
control an angle, distance and/or viewpoint appearance of content in the first stream of data as a function of the telemetry information.

6. The system of claim 1, wherein the computing device is further configured by code stored in the memory and executed by the processor to:
alter appearance of content in the second data stream, including position in a frame of the coordinated presentation as a function of input received in an authoring tool interface.

7. The system of claim 1, wherein the computing device is further configured by code stored in the memory and executed by the processor to:
substitute a portion of content in the second data stream with at least a portion of content in the first data stream as a function of at least a chroma value appearing in the content in the second data stream.

8. The system of claim 1, wherein the angle, distance and/or viewpoint of content in the first stream of data is controlled by adjusting the first stream of data to correspond oppositely to appearance of content in the second data stream.

9. The system of claim 1, wherein the computing device is further configured by code stored in the memory and executed by the processor to:
position content associated with second data stream to appear virtually integrated into the first data stream.

10. The system of claim 1, wherein the computing device is further configured by code stored in the memory and executed by the processor to modify at least some of the content including by changing perspective, skew, brightness, contrast and/or saturation.

11. A method for generating a coordinated presentation, comprising:
receiving, by the computing device, a first data stream associated with first content and a second data stream associated with images captured via an image capture device, wherein none of the images captured via the image capture device are included in the first content;
defining, by the computing device, a portion of a subject within each of the plurality of images in the second data stream, wherein the portion comprises less than any one image;
tracking, by the computing device, an appearance of movement of the portion of the subject within each of the plurality of images;
modifying, by the computing device as a function of the tracked appearance of movement, at least some of the plurality of images in the second data stream by displaying the portion in a single position; and
integrating, by the computing device, respective content associated with the two data streams, including the modified at least some of the plurality of images, to generate the coordinated presentation that is capable of transmission to and receipt by one or more remote devices.

12. The method of claim 11, further comprising:
processing, by the computing device, telemetry information associated with at least one of a gyroscope and accelerometer, wherein the tracked appearance of movement is based on the telemetry information.

13. The method of claim 12, wherein the telemetry information represents computing device movement associated with distance, speed and direction in at least one of an X-axis, a Y-axis and a Z-axis.

14. The method of claim 12, further comprising:
altering, by the computing device, placement and/or alter an angle of view of the at least some of the content in the first data stream.

15. The method of claim 12, wherein the content in the first data stream includes a 360 degree horizontal view and a 180 degree vertical view, and
further comprising:
controlling, by the computing device, an angle, distance and/or viewpoint appearance of content in the first stream of data as a function of the telemetry information.

16. The method of claim 11, further comprising:
altering, by the computing device, appearance of content in the second data stream, including position in a frame of the coordinated presentation as a function of input received in an authoring tool interface.

17. The method of claim 11, further comprising:
substituting, by the computing device, a portion of content in the second data stream with at least a portion of content in the first data stream as a function of at least a chroma value appearing in the content in the second data stream.

18. The method of claim 11, wherein the angle, distance and/or viewpoint of content in the first stream of data is controlled by adjusting the first stream of data to correspond oppositely to appearance of content in the second data stream.

19. The method of claim 11,
further comprising:
positioning, by the computing device, content associated with second data stream to appear virtually integrated into the first data stream.

20. The method of claim 11, further comprising: modifying at least some of the content including by changing perspective, skew, brightness, contrast and/or saturation.

* * * * *